(12) United States Patent
Yang et al.

(10) Patent No.: US 11,386,670 B2
(45) Date of Patent: Jul. 12, 2022

(54) METHODS AND SYSTEMS FOR TRACKING NON-CONNECTED VEHICLES

(71) Applicant: Toyota Motor Engineering & Manufacturing North America, Inc., Plano, TX (US)

(72) Inventors: Hao Yang, Aliso Viejo, CA (US); Rui Guo, San Jose, CA (US); Baik Hoh, Campbell, CA (US); Kentaro Oguchi, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 336 days.

(21) Appl. No.: 16/592,349

(22) Filed: Oct. 3, 2019

(65) Prior Publication Data

US 2021/0103740 A1 Apr. 8, 2021

(51) Int. Cl.
| | | |
|---|---|---|
| *G06K 9/00* | (2022.01) | |
| *G06V 20/56* | (2022.01) | |
| *G05D 1/02* | (2020.01) | |
| *G08G 1/16* | (2006.01) | |
| *G01S 17/89* | (2020.01) | |

(52) U.S. Cl.
CPC .............. *G06V 20/56* (2022.01); *G01S 17/89* (2013.01); *G05D 1/0285* (2013.01); *G05D 1/0287* (2013.01); *G08G 1/163* (2013.01)

(58) Field of Classification Search
CPC ............. G06K 9/00791; G06K 9/6271; G06K 9/00825; G01S 17/89; G05D 1/0285; G05D 1/0287; G05D 1/0088; G05D 2201/0213; G05D 1/0212; G08G 1/163; G08G 1/0175; G08G 1/127; B60W 2720/10

USPC .......................................................... 382/103
See application file for complete search history.

(56) References Cited

U.S. PATENT DOCUMENTS

| | | |
|---|---|---|
| 6,873,912 B2 | 3/2005 | Shimomura |
| 7,929,728 B2 | 4/2011 | Guo et al. |
| 8,073,565 B2 * | 12/2011 | Johnson .............. H04M 3/4878 455/456.3 |

(Continued)

OTHER PUBLICATIONS

Jiangfeng Wang, et al., "Dynamic Route Choice Prediction Model Based on Connected Vehicle Guidance Characteristics," Journal of Advanced Transportation vol. 2017, Article ID 6905431, Feb. 14, 2017, URL: https://www.hindawi.com/journals/jat/2017/6905431/.

(Continued)

*Primary Examiner* — Mahendra R Patel
(74) *Attorney, Agent, or Firm* — Dinsmore & Shohl LLP

(57) ABSTRACT

A method for tracking a non-connected vehicle is provided. The method includes obtaining one or more features of the non-connected vehicle, assigning an ID to the non-connected vehicle, the ID including information about the one or more features of the non-connected vehicle, predicting one or more locations of the non-connected vehicle in response to the non-connected vehicle being out of a field of view of a connected vehicle at a first location, identifying a vehicle at a second location, the second location corresponding to one of the predicted one or more locations, and determining whether the identified vehicle at the second location corresponds to the non-connected vehicle based on a comparison of one or more features of the identified vehicle and the ID.

20 Claims, 8 Drawing Sheets

(56) References Cited

U.S. PATENT DOCUMENTS

| | | | |
|---|---|---|---|
| 8,108,147 B1* | 1/2012 | Blackburn | G08G 1/166 |
| | | | 382/104 |
| 8,401,737 B2 | 3/2013 | Aso | |
| 9,618,347 B2* | 4/2017 | Chambers | G01C 21/3484 |
| 9,836,976 B2* | 12/2017 | Probert | H04L 67/12 |
| 9,868,393 B2* | 1/2018 | Bahgat | B60W 50/0097 |
| 9,922,565 B2* | 3/2018 | Thomas | G06K 9/6292 |
| 9,987,984 B2* | 6/2018 | Goudy | G01S 11/026 |
| 9,989,964 B2* | 6/2018 | Berntorp | G06N 3/049 |
| 10,068,477 B2* | 9/2018 | Miller | G08G 1/162 |
| 10,162,355 B2* | 12/2018 | Hayon | G01C 21/3602 |
| 10,703,483 B1* | 7/2020 | Rajasingham | B60N 2/34 |
| 11,004,000 B1* | 5/2021 | Gutmann | B60W 30/0956 |
| 11,110,941 B2* | 9/2021 | Wray | G08G 1/163 |
| 2007/0163431 A1* | 7/2007 | Mohar | B60R 25/043 |
| | | | 89/1.11 |
| 2017/0008521 A1* | 1/2017 | Braunstein | G01C 21/165 |
| 2017/0025018 A1* | 1/2017 | Gignac | G08G 1/163 |
| 2017/0371345 A1* | 12/2017 | Cohen | G06T 7/73 |
| 2018/0053313 A1* | 2/2018 | Smith | H04N 7/181 |
| 2018/0211529 A1 | 7/2018 | Kaur et al. | |
| 2018/0261097 A1* | 9/2018 | Jiang | H04L 67/12 |
| 2018/0293884 A1 | 10/2018 | Liu et al. | |
| 2020/0065711 A1* | 2/2020 | Clement | G06N 3/0454 |
| 2021/0142526 A1* | 5/2021 | Mantyjarvi | B60W 50/0097 |

OTHER PUBLICATIONS

David Hallac, et al., "Driver Identification Using Automobile Sensor Data From Single Turn," IEEE 19th International Conference on Intelligent Transportation Systems (ITSC), pp. 953-958, Nov. 2016.

Jiangpeng Dai, et al., "Mobile Phone Based Drunk Driving Detection," IEEE 4th International Conference on Pervasive Computing Technologies for Healthcare., pp. 1-8, Mar. 2010.

Yanlin Guo, et al., "Vehicle Fingerprinting for Reacquisition and Tracking in Videos," IEEE Computer Society Conference on Computer Vision and Pattern Recognition (CVPR'05), Jun. 2005.

Benjamin Coifman, et al., "A Real-Time Computer Vision System for Vehicle Tracking and Traffic Surveillance," Transportation Research Part C: Emerging Technologies, vol. 6(4), pp. 271-288, 1998.

Donald B. Reid, "An Algorithm For Tracking Multiple Targets," IEEE Transactions on Automatic Control, vol. 24(6), pp. 843-854, Dec. 1979.

* cited by examiner

METHODS AND SYSTEMS FOR TRACKING NON-CONNECTED VEHICLES

TECHNICAL FIELD

The present specification relates to tracking non-connected vehicles traveling a long distance, and more particularly, to tracking a non-connected vehicle with connected vehicles by extracting features of the non-connected vehicle and identifying the non-connected vehicle at a remote location using the extracted features.

BACKGROUND

Connected vehicles may generate large volumes of data (e.g., kinematics data including speed, direction, and acceleration/deceleration data, as well as sensory data including steering angle and input acceleration pedal force data) that need to be processed to extract useful information and produce results or predictions in real-time by utilizing the capabilities of edge computing.

In the era of connected vehicles, understanding the behaviors of all vehicles may be important to develop advanced traffic and vehicle management systems. However, due to the low market penetration rate of connected vehicles, a significant number of non-connected vehicles that do not have internet access still drive on the roads. Identifying and tracking the non-connected vehicles is a challenging problem to estimate real-time traffic conditions more accurately, especially when the non-connected vehicles drive a long distance.

Accordingly, a need exists for providing a method and system for tracking non-connected vehicles that travel long distances.

SUMMARY

The present disclosure provides systems and methods for tracking a non-connected vehicle even when the non-connected vehicle is out of a field of view of connected vehicles by extracting features of the non-connected vehicle, identifying the non-connected vehicle at a remote location based on the extracted features, and estimating a trajectory for the non-connected vehicle while the non-connected vehicle is not monitored by connected vehicles. The present system utilizes sensors installed in connected vehicles, such as camera sensors, GPS sensors, LIDAR sensors, and the like to monitor a nearby non-connected vehicle in real-time. The vehicle feature information extracted from the images that are captured by the cameras installed in the connected vehicles is stored and shared among connected vehicles. In addition, the driving pattern of the non-connected vehicle may be monitored by connected vehicles and extracted as one additional factor to identify the vehicle. The vehicle feature information along with the driving pattern are later utilized to identify the non-connected vehicle at a different location even after the non-connected vehicle is out of the field of view of the connected vehicles.

According to the present disclosure, for long-distance tracking of a non-connected vehicle, once the non-connected vehicle is out of a field of view of connected vehicles, the future locations of the non-connected vehicle may be predicted based on the real-time traffic conditions and the possible trajectories of the non-connected vehicle. When a non-connected vehicle is later observed by another connected vehicle at one of the predicted locations, the system may compare the feature and driving pattern of the previously identified non-connected vehicle with the features of the newly identified non-connected vehicle to determine whether the newly identified non-connected vehicle is the one monitored previously.

In one embodiment, a method for tracking a non-connected vehicle is provided. The method includes obtaining one or more features of the non-connected vehicle, assigning an ID to the non-connected vehicle, the ID including information about the one or more features of the non-connected vehicle, predicting one or more locations of the non-connected vehicle in response to the non-connected vehicle being out of a field of view of a connected vehicle at a first location, identifying a vehicle at a second location, the second location corresponding to one of the predicted one or more locations, and determining whether the identified vehicle at the second location corresponds to the non-connected vehicle based on a comparison of one or more features of the identified vehicle and the ID.

In another embodiment, a controller for tracking a non-connected vehicle is provided. The controller includes one or more processors, one or more memory modules, and machine readable instructions stored in the one or more memory modules. The controller obtains one or more features of the non-connected vehicle, assigns an ID to the non-connected vehicle, the ID including information about the one or more features of the non-connected vehicle, predicts one or more locations of the non-connected vehicle in response to the non-connected vehicle being out of a field of view of a connected vehicle at a first location, identifies a vehicle at a second location, the second location corresponding to one of the predicted one or more locations, and determines whether the identified vehicle at the second location corresponds to the non-connected vehicle based on a comparison of one or more features of the identified vehicle and the ID.

In yet another embodiment, a system for tracking a non-connected vehicle is provided. The system includes a first connected vehicle, a second connected vehicle, and a server communicatively coupled to the first connected vehicle and the second connected device. The server is configured to obtain one or more features of the non-connected vehicle from the first connected vehicle, assign an ID to the non-connected vehicle, the ID including information about the one or more features of the non-connected vehicle, predict one or more locations of the non-connected vehicle in response to the non-connected vehicle being out of a field of view of a connected vehicle at a first location, receive one or more features of a vehicle at a second location from the second connected vehicle, the second location corresponding to one of the predicted one or more locations, and determine whether the vehicle at the second location corresponds to the non-connected vehicle based on a comparison of the one or more features of the vehicle at the second location and the ID.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
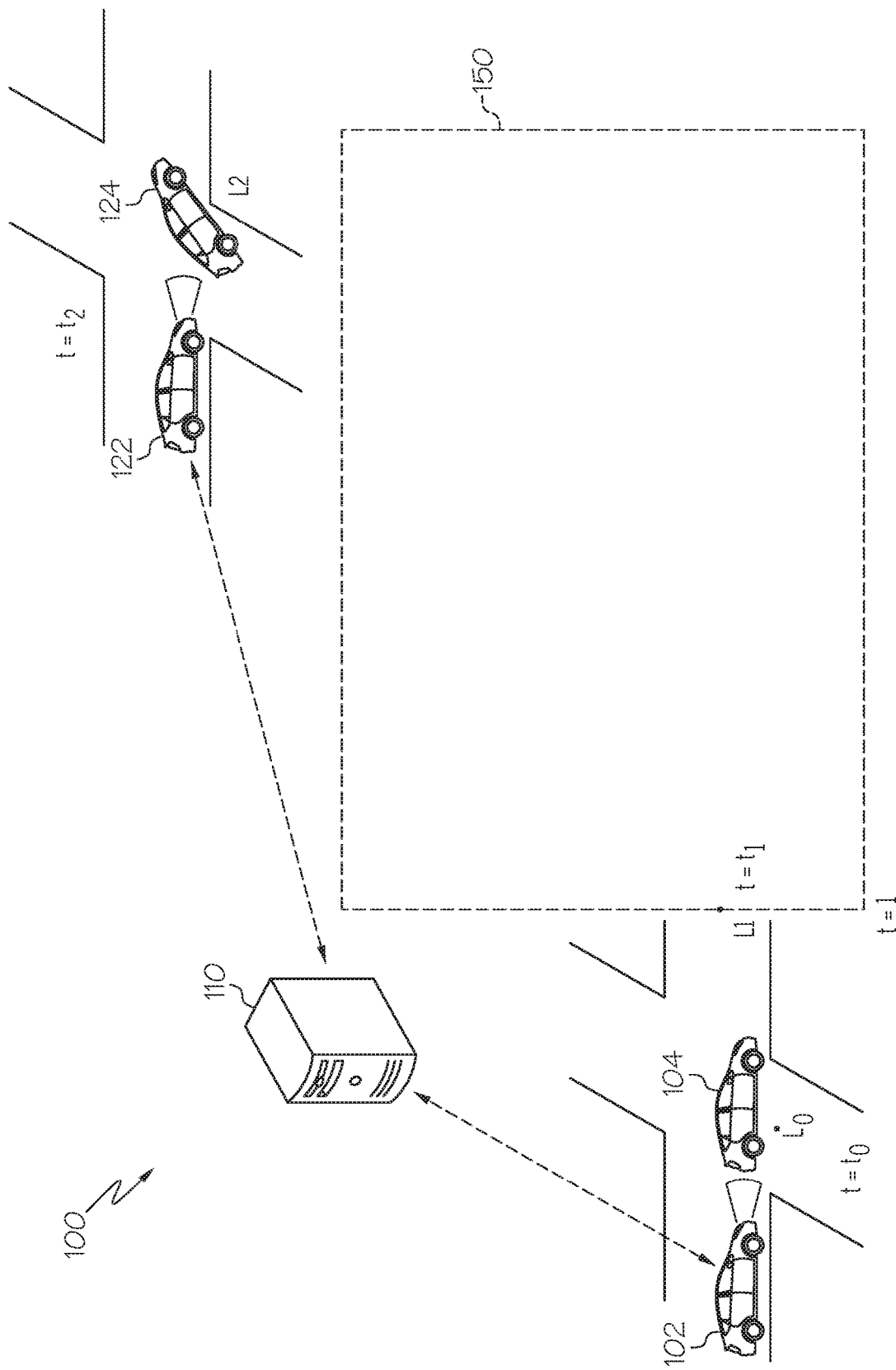
FIG. 1 schematically depicts a system for identifying and tracking a non-connected vehicle, according to one or more embodiments shown and described herein.
Figure 2:
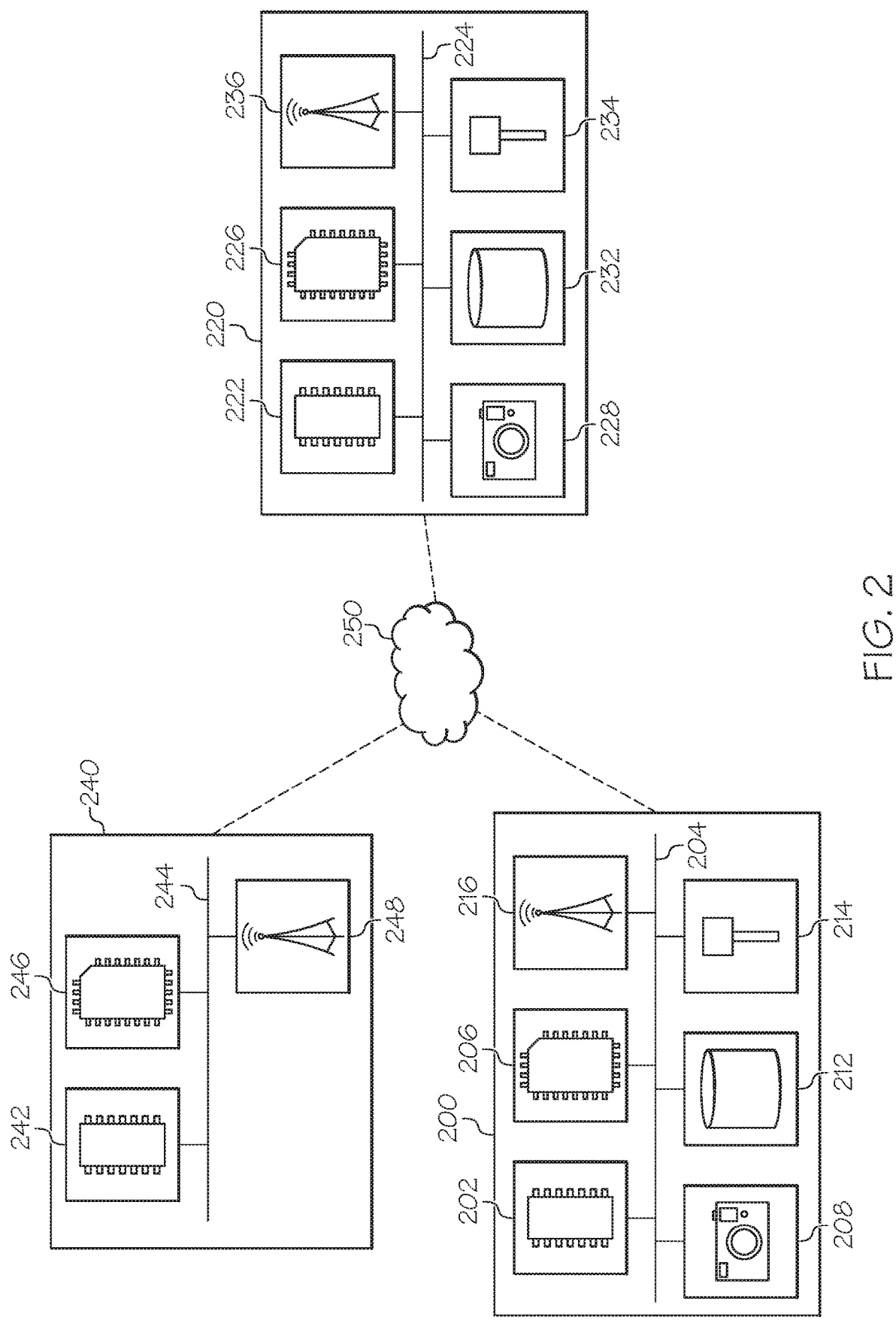
FIG. 2 schematically depicts a system for tracking a non-connected vehicle, according to one or more embodiments shown and described herein.

The embodiments disclosed herein include systems and methods for tracking a non-connected vehicle that travels a long distance. Referring to FIGS. 1 and 2, the present system utilizes sensors 208 (e.g., cameras, GPS sensors, Light Detection and Ranging (LIDAR) sensors, and the like) installed in connected vehicles 102 and 122 to monitor a non-connected vehicle 104 nearby in real-time. The vehicle feature information extracted from the images that are captured by the cameras installed in the connected vehicle 102 is stored and shared among connected vehicles. For example, the connected vehicle 102 may share the vehicle feature information about the non-connected vehicle 104 with the connected vehicle 122. In addition, the driving pattern of the non-connected vehicle 104 may be monitored by the connected vehicle 102 and extracted as one additional factor to identify the vehicle. The connected vehicle 102 may also share the driving pattern information about the non-connected vehicle 104 with the connected vehicle 122. The vehicle feature information along with the driving pattern information are later utilized to identify the non-connected vehicle 104 at a different location (e.g., location $L_2$) even after the non-connected vehicle 104 has been out of a field of views of the connected vehicle 102 (e.g., after the non-connected vehicle 104 drives within the area 150).

According to the present disclosure, for long-distance tracking of the non-connected vehicle 104, the non-connected vehicle 104 may be out of view of connected vehicles at time $t_1$ as shown in FIG. 1. The potential future locations of the non-connected vehicle 104 may be predicted based on real-time traffic conditions and the possible trajectories of the non-connected vehicle 104, for example, predicted locations 430 for a connected vehicle 410 shown in FIG. 4. A non-connected vehicle 124 may be observed by another connected vehicle (e.g., a connected vehicle 122) at one of the predicted future locations, for example, location $L_2$ in FIG. 1. Then, the system may compare the vehicle feature and driving pattern of the previously identified non-connected vehicle 104 with the features of the newly identified non-connected vehicle 124 to determine whether the newly identified non-connected vehicle 124 corresponds to the previously identified non-connected vehicle 104. If the newly identified non-connected vehicle 124 corresponds to the previously identified non-connected vehicle 104, the system may estimate a trajectory between location $L_1$ and location $L_2$ for the non-connected vehicle 104 such that an entire driving trajectory of the non-connected vehicle 104 is estimated.

In contrast with conventional technologies, the present disclosure may track non-connected vehicles accurately based on both features and driving patterns of non-connected vehicles that are collected by connected vehicles. In addition, the present disclosure may track non-connected vehicles traveling long-distances by predicting locations of the non-connected vehicles based on real-time traffic conditions. Furthermore, the systems according to the present disclosure may continuously track non-connected vehicles even if they are not observed continuously by connected vehicles. That is, the present system may track non-connected vehicles even at a low market penetration rate of connected vehicles without continuous observations of the non-connected vehicles.

FIG. 1 schematically depicts a system for identifying and tracking a non-connected vehicle, according to one or more embodiments shown and described herein. In embodiments, a system 100 includes connected vehicles 102 and 122, non-connected vehicle 104 and 124, and a server 110.

Each of the connected vehicles 102 and 122 and the non-connected vehicles 104 and 124 may be a vehicle including an automobile or any other passenger or non-passenger vehicle such as, for example, a terrestrial, aquatic, and/or airborne vehicle. In some embodiment, one or more of the connected vehicles 102 and 122 and the non-connected vehicle 104 may be an unmanned aerial vehicle (UAV), commonly known as a drone.

The connected vehicles 102 and 122 may be autonomous and connected vehicles, each of which navigates its environment with limited human input or without human input. The connected vehicles 102 and 122 are equipped with internet access and share data with other devices both inside and outside the connected vehicles 102 and 122. The connected vehicles 102 and 122 may communicate with a server 110. Each of the connected vehicles 102 and 122 may extract information about other vehicles using various sensors. In embodiments, each of the connected vehicles 102 and 122 may extract visual features of a non-connected vehicle close to the vehicles 102 and 122. For example, the connected vehicle 102 may identify the non-connected vehicle 104 at location $L_0$ at time to using sensors. The location of the non-connected vehicle 104 (e.g., $L_0$), the time of identifying the non-connected vehicle 104 (e.g., $t=t_0$), and a temporary ID for the non-connected vehicle, which will be described below, may be stored in the connected vehicle 102, or may be transmitted to the server 110. The connected vehicle 102 may identify the non-connected vehicle 104 proximate to the connected vehicle 102 as a non-connected vehicle. The connected vehicle 102 may determine that the vehicle 104 is a non-connected vehicle based on communication abilities of the vehicle 104. For example, the connected vehicle 102 may determine whether the vehicle 104 is a non-connected vehicle based on whether the connected vehicle 102 receives wireless signals from the vehicle 104. The connected vehicle 102 may capture images of the non-connected vehicle 104 using imaging sensors and apply a deep neural network to the captured images. In some embodiments, the connected vehicle 102 may transmit captured images to the server 110 and the server 110 may apply a deep neural network to the captured images.

Additionally, the connected vehicle 102 may extract multiple scale modality features as the initial representation of the non-connected vehicle 104 based on the captured images. For example, the connected vehicle 102 may gather multi-scale texture features, color features, and/or view point information of the non-connected vehicle 104. As another example, the connected vehicle 102 may capture an accessory attached to the non-connected vehicle 104 using imaging sensors and identify the accessory as a feature of the non-connected vehicle 104. The complete feature set may describe the non-connected vehicle 104 comprehensively. The feature set may be fed into a fully connected layer of a neural network to generate a compact representation of the features for the non-connected vehicle 104. The compact representation may be used as one factor associated with a temporary ID of the non-connected vehicle 104.

In embodiments, each of the connected vehicles 102 and 122 may recognize a short-term driving behavior of a nearby vehicle. For example, the connected vehicle 102 may continuously monitor the non-connected vehicle 104 using sensors (e.g., cameras, radar sensors, LIDAR sensors, etc.) and capture short-term dynamics of the non-connected vehicle 104. The connected vehicle 102 may analyze the short-term dynamics of the non-connected vehicle 104 to identify the driving pattern of the non-connected vehicle 104, such as speed and acceleration profiles and driving styles at turns. In some embodiments, the connected vehicle 102 may transmit the short-term dynamics of the non-connected vehicle 104 to the server 110 and the server may analyze the short-term dynamics of the non-connected vehicle 104 to identify the driving pattern of the non-connected vehicle 104. The driving pattern may be then utilized as one additional factor associated with the temporary ID for the non-connected vehicle 104. The combination of the vehicle visual features and the driving pattern may be used to identify non-connected vehicles.

In embodiments, the temporary ID for a vehicle may be shared among connected vehicles. For example, the connected vehicle 102 may store the temporary ID for the non-connected vehicle 104. The temporary ID for the non-connected vehicle 104 may include feature information (e.g., visual features of the non-connected vehicle 104) and driving pattern information of the non-connected vehicle 104. The connected vehicle 102 may transmit the temporary ID for the non-connected vehicle 104 to the server 110, which then relays the temporary ID to other connected vehicles, for example, the connected vehicle 122 in FIG. 1. As another example, the connected vehicle 102 may transmit the temporary ID for the non-connected vehicle 104 to other connected vehicles via vehicle-to-vehicle (V2V) communication, or transmit the temporary ID for the non-connected vehicle 104 to edge computing devices (e.g., road-side units) via vehicle-to-everything (V2X) communication.

Still referring to FIG. 1, the non-connected vehicle 104 may be out of a field of view of any connected vehicle at a location $L_1$ at time $t_1$. An area 150 is an area where a non-connected vehicle is out of a field of view of any connected vehicle. That is, when the non-connected vehicle 104 travels within the area 150, the movement of the non-connected vehicle cannot be monitored by connected vehicles because no connected vehicle is present within or proximate to the area 150.

Still referring to FIG. 1, at time $t_2$, the connected vehicle 122 identifies a non-connected vehicle 124 at location $L_2$. The connected vehicle 122 may determine whether the non-connected vehicle 124 corresponds to (e.g., is the same as) the non-connected vehicle 104 identified by the connected vehicle 102 based on the temporary ID for the non-connected vehicle 104 received from the server 110 or from the connected vehicle 102. Once it is determined that the non-connected vehicle 124 is the non-connected vehicle 104, the connected vehicle 122 or other connected vehicle proximate to the non-connected vehicle 124 may continue tracking the non-connected vehicle 124, which is the non-connected vehicle 104.

FIG. 2 schematically depicts a system for tracking a non-connected vehicle, according to one or more embodiments shown and described herein. The system for tracking a non-connected vehicle includes a first connected vehicle system 200, a second connected vehicle system 220, and a server system 240.

It is noted that, while the first connected vehicle system 200 and the second connected vehicle system 220 are depicted in isolation, each of the first connected vehicle system 200 and the second connected vehicle system 220 may be included within a vehicle in some embodiments, for example, respectively within each of the connected vehicles 102 and 122 of FIG. 1. In embodiments in which each of the first connected vehicle system 200 and the second connected vehicle system 220 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The first connected vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first connected vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the first connected vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. The image data may include image data of the non-connected vehicle 104 in FIG. 1. In some embodiments, the one or more sensors 208 may also provide navigation support. That is, data captured by the one or more sensors 208 may be used to autonomously or semi-autonomously navigate the connected vehicle 102.

In some embodiments, the one or more sensors 208 include one or more imaging sensors configured to operate in the visual and/or infrared spectrum to sense visual and/or infrared light. Additionally, while the particular embodiments described herein are described with respect hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image. The first connected vehicle system 200 capture short-term dynamics of a non-connected vehicle (e.g., the non-connected vehicle 104 in FIG. 1) using one or more imaging sensors. The one or more processors 202 may analyze the short-term dynamics of the non-connected vehicle 104 to identify the driving pattern of the non-connected vehicle 104 such as speed and acceleration profiles and driving styles at turns.

In operation, the one or more sensors 208 captures image data and communicates the image data to the one or more processors 202 and/or to other systems communicatively coupled to the communication path 204. The image data may be received by the one or more processors 202, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The first connected vehicle system 200 comprises a satellite antenna 214 coupled to the communication path 204 such that the communication path 204 communicatively couples the satellite antenna 214 to other modules of the first connected vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The first connected vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle. The one or more vehicle sensors 212 may include a fuel sensor that measures the level of fuel of the vehicle. The one or more vehicle sensors 212 may also include one or more sensors for detecting the angle of a steering wheel of a vehicle, one or more sensors for detecting an acceleration pedal force, and one or more sensors for detecting a braking force.

Still referring to FIG. 2, the first connected vehicle system 200 comprises network interface hardware 216 for communicatively coupling the first connected vehicle system 200 to the second connected vehicle system 220 and/or the server system 240. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first connected vehicle system 200 may transmit its data to the server system 240. For example, the network interface hardware 216 of the first connected vehicle system 200 may transmit information about the non-connected vehicle 104, such as the temporary ID for the non-connected vehicle 104 that includes vehicle visual features and driving patterns.

The vehicle system 200 may connect with one or more external vehicles and/or external processing devices (e.g., the server system 240) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the network 250), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first connected vehicle system 200 may be communicatively coupled to the server system 240 by a network 250. In one embodiment, the network 250 may include one or more computer networks (e.g., a personal area network, a local area network, or a wide area network), cellular networks, satellite networks and/or a global positioning system and combinations thereof. Accordingly, the first connected vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the server system 240 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The communication path 244 may be similar to the communication path 204 in some embodiments. The server system 240 may be included in the server 110 in FIG. 1.

The one or more memory modules 246 may include machine readable instructions that, when executed by the one or more processors 242, receive one or more features of a non-connected vehicle such as the non-connected vehicle 104 in FIG. 1 and/or a driving pattern of the non-connected vehicle, and assign a temporary ID to the non-connected vehicle based on the one or more features and the driving pattern of the non-connected vehicle. The one or more memory modules 246 may store temporary IDs for non-connected vehicles such as the non-connected vehicle 104.

Still referring to FIG. 2, the second connected vehicle system 220 includes one or more processors 222, one or more memory modules 226, one or more sensors 228, one or more vehicle sensors 232, network interface hardware 236, and a communication path 224. The components of the second connected vehicle system 220 may be structurally similar to and have similar functions as the corresponding components of the first connected vehicle system 200.

Figure 3:
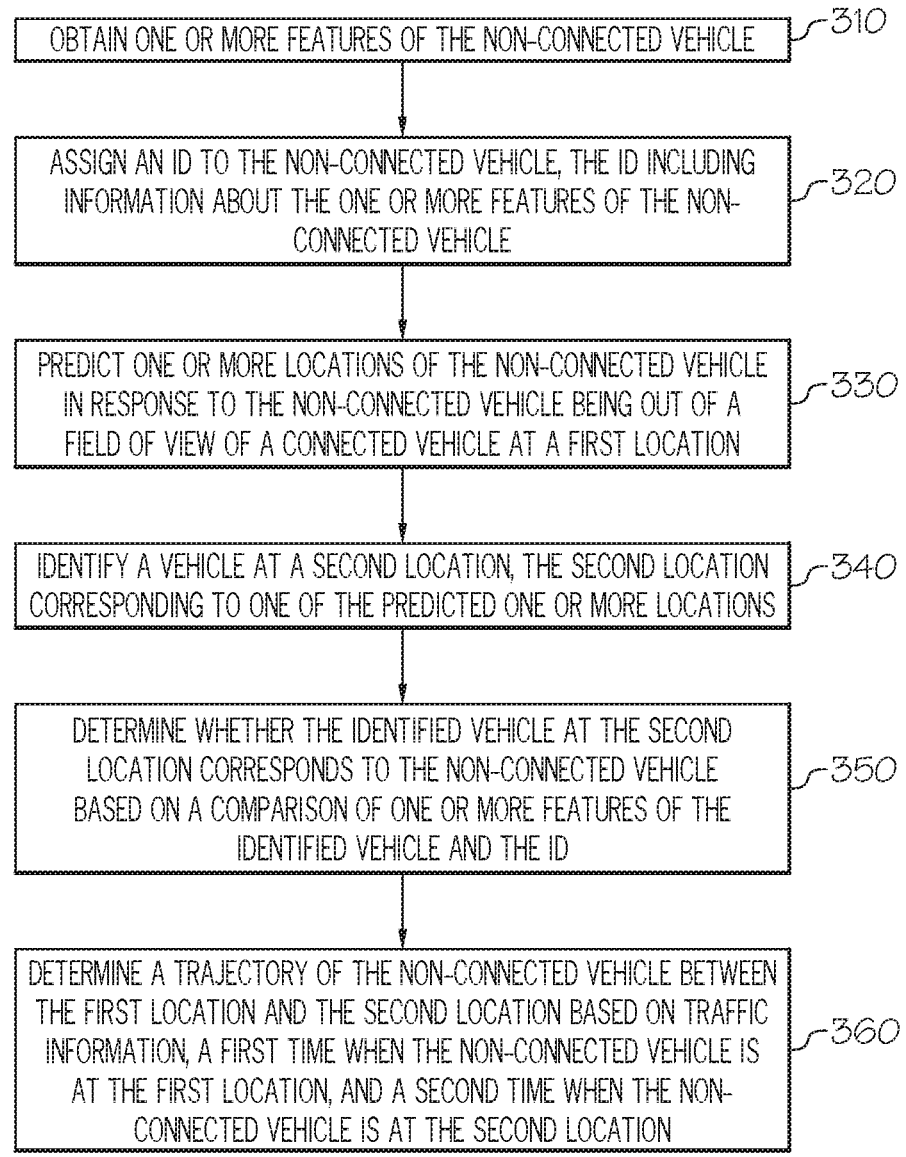
FIG. 3 depicts a flowchart for tracking a non-connected vehicle using connected vehicles, according to one or more embodiments shown and described herein.

FIG. 3 depicts a flowchart for tracking a non-connected vehicle using connected vehicles, according to one or more embodiments shown and described herein.

In step 310, a server obtains one or more features of a non-connected vehicle. In embodiments, by referring to FIG. 4A, a connected vehicle 422 may capture images of a non-connected vehicle 410 using imaging sensors at time to, and transmit captured images to a server such as the server 110 in FIG. 1. Additionally, the connected vehicle 422 may extract multiple scale modality features as the initial representation of the non-connected vehicle 410 based on the captured images. For example, the connected vehicle 422 may gather multi-scale texture feature, color feature, and view point information of the non-connected vehicle 410. As another example, the connected vehicle 422 may capture an accessory attached to the non-connected vehicle 410 using imaging sensors and identify the accessory as a feature of the non-connected vehicle 410. The connected vehicle 422 may transmit the collected features with respect to the non-connected vehicle 410 to the server. The server may feed the received feature set into a fully connected layer of a neural network to generate a compact representation of the features.

In embodiments, the connected vehicle 422 may recognize a short-term driving behavior of the non-connected vehicle 410 and transmit the short-term driving behavior to the server. For example, the connected vehicle 422 may continuously monitor the non-connected vehicle 410 using sensors including radar sensors and LIDAR sensors and capture short-term dynamics of the non-connected vehicle 410. The connected vehicle 422 may analyze the short-term dynamics of the non-connected vehicle 104 to identify the driving pattern of the non-connected vehicle 104 (e.g., speed and acceleration profiles and driving styles at turns). In some embodiments, the connected vehicle 422 may transmit the short-term dynamics of the non-connected vehicle 410 to the server and the server may analyze the short-term dynamics of the non-connected vehicle 410 to identify the driving pattern of the non-connected vehicle 410. The driving pattern may be then utilized as one additional factor associated with the temporary ID for the non-connected vehicle 410.

Figure 4A:
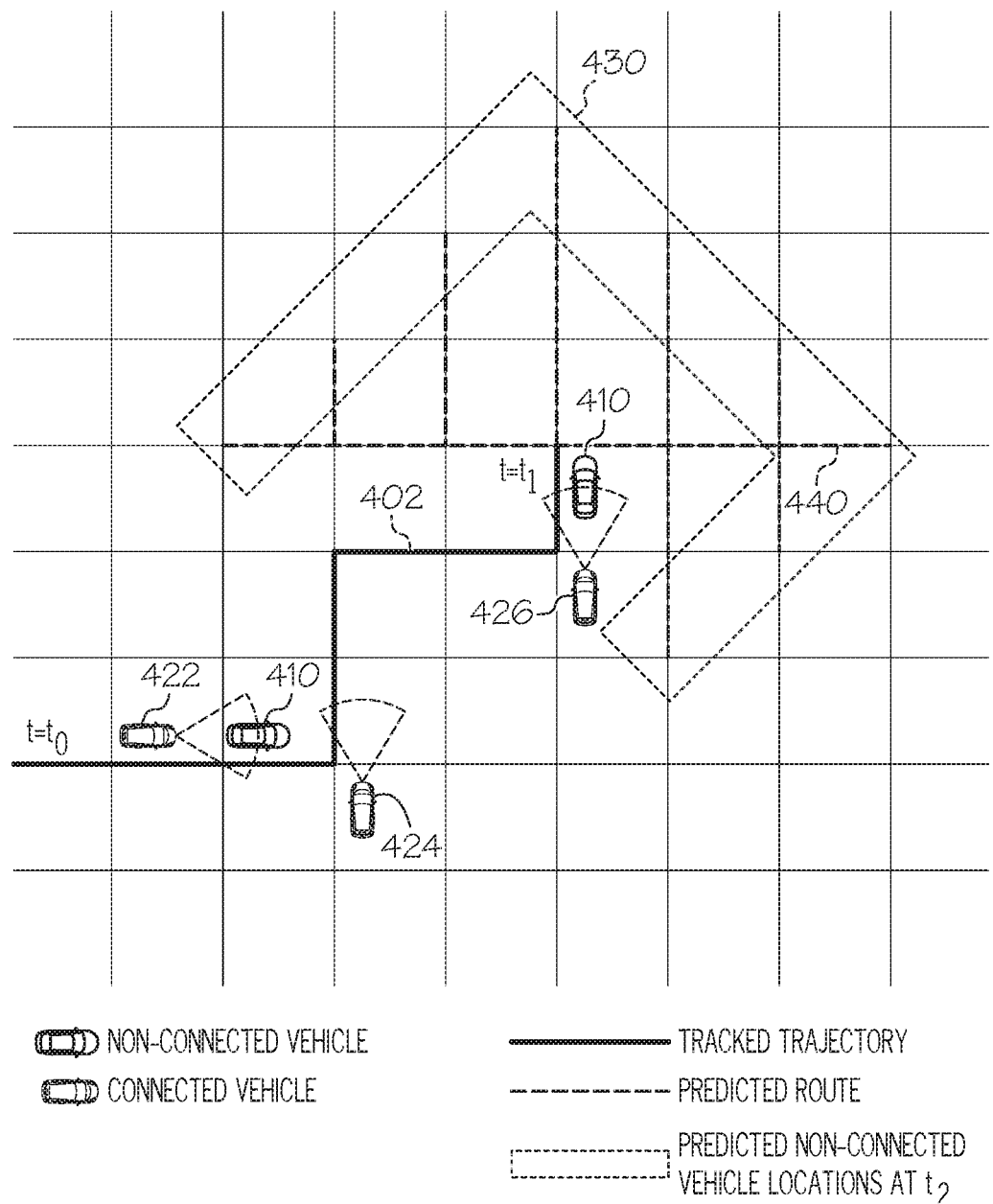
FIG. 4A depicts predicting future locations of a non-connected vehicle, according to one or more embodiments shown and described herein.

Referring back to FIG. 3 in conjunction with FIG. 4A, in step 320, the server may assign an ID to a non-connected vehicle. In embodiments, the ID includes information about one or more features of the non-connected vehicle. For example, as described above, the ID may include information about multi-scale texture feature, color feature, view point information, and/or accessories of the non-connected vehicle 410. In addition, the ID may include driving patterns of the non-connected vehicle 410 (e.g., speed and acceleration profiles and driving styles at turns). The combination of the vehicle visual features and the driving pattern may be included in the ID.

In step 330, the server may predict one or more locations of the non-connected vehicle in response to the non-connected vehicle being out of a field of view of a connected vehicle at a first location. By referring to FIG. 4A, the non-connected vehicle 410 may be monitored by one or more connected vehicles. For example, the connected vehicle 422 may monitor the non-connected vehicle 410, and once the non-connected vehicle 410 moves far away from the connected vehicle 422, another connected vehicle, e.g., a connected vehicle 424 may monitor the non-connected vehicle 410. One or more connected vehicles may continuously report the location and/or features of the non-connected vehicle 410 to the server. At time $t_1$, the non-connected vehicle 410 becomes out of field of view of a connected vehicle 426, and no other connected vehicles are able to monitor the non-connected vehicle 410. That is, imaging devices of any connected vehicle may not be able to capture images of the non-connected vehicle 410 or identify the non-connected vehicle 410 using sensors.

Once the non-connected vehicle 410 is out of a field of view of any connected vehicle, the server may predict one or more locations of the non-connected vehicle 410. For example, by referring to FIG. 4A, the server may predict potential trajectories 440 for the non-connected vehicle 410. The potential trajectories may be determined based on real-time traffic information such as average speed, density, travel time, and the like. The real-time traffic information may be gathered from connected vehicles in the area. The potential trajectories 440 start from the location where the non-connected vehicle 410 becomes out of field of view of any connected vehicles to predicted locations 430 at future time $t_2$. The predicted locations 430 at a future time (e.g., time $t_2$) are determined based on the real-time traffic information (e.g., road traffic conditions, average speeds, accidents, road constructions, and the like) and the time difference, i.e., different time $t_1$ and time $t_2$.

Referring to FIG. 3, in step 340, a connected vehicle may identify a vehicle at a second location that corresponds to one of the predicted one or more locations. By referring to FIG. 4B, a connected vehicle 450 may identify a non-connected vehicle 460 at location $L_2$ at time $t_2$. The location $L_2$ is one of the predicted locations determined in step 330.

Figure 4B:
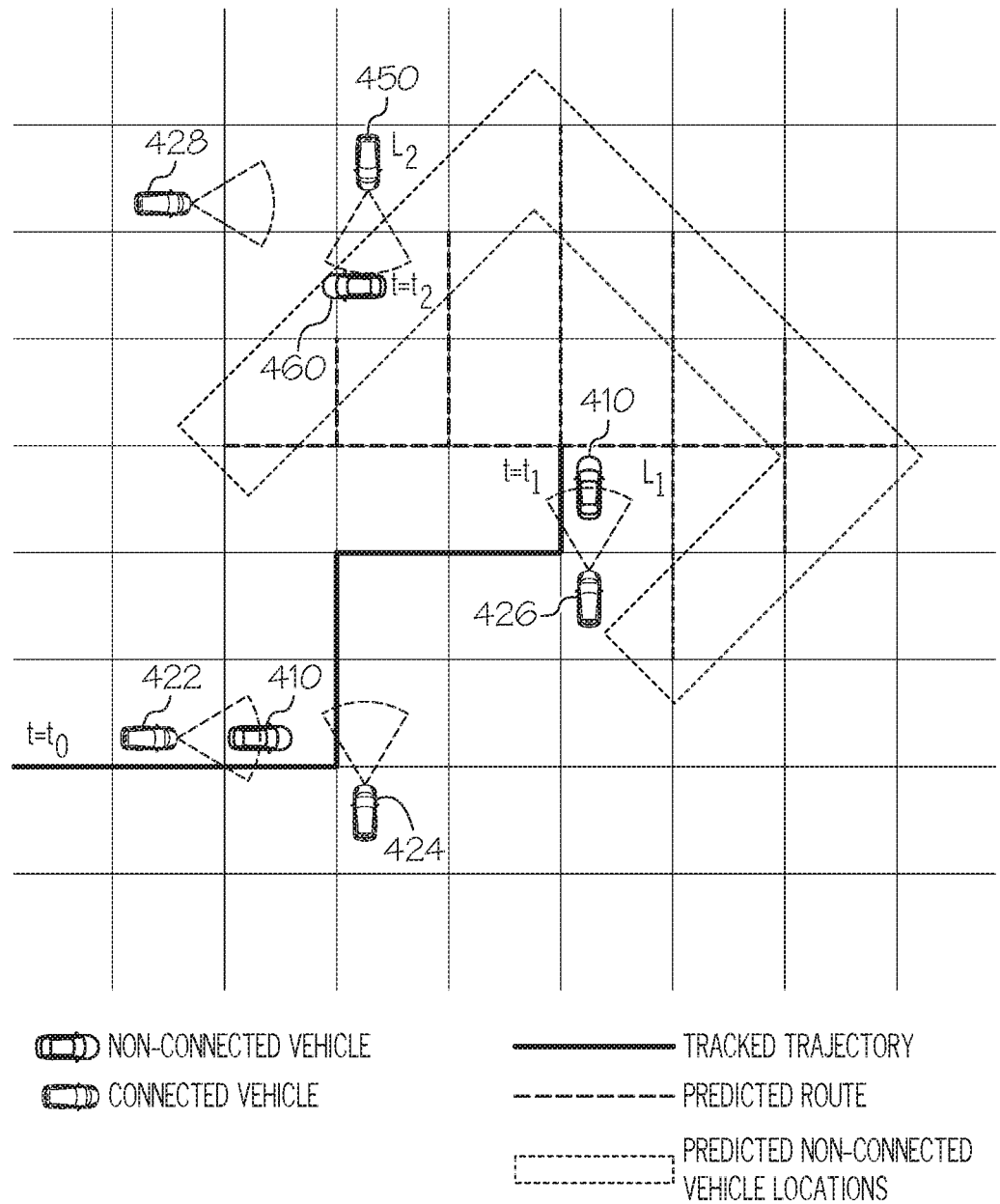
FIG. 4B depicts identifying a non-connected vehicle at a predicted location for the non-connected vehicle, according to one or more embodiments shown and described herein.

Still referring to FIG. 3 in conjunction with FIG. 4B, in step 350, a connected vehicle may determine whether the identified vehicle at the second location corresponds to the previously identified non-connected vehicle based on a comparison of one or more features of the identified vehicle and the ID for the previously identified non-connected vehicle. For example, the connected vehicle 450 may capture images of the non-connected vehicle 460 and obtain features, such as multi-scale texture feature, color feature, view point information, and/or accessories of the non-connected vehicle 460. Then, the connected vehicle 450 may compare the obtained features of the non-connected vehicle 460 with the features included in the ID for the previously identified connected vehicle, e.g., the non-connected vehicle 410. If the features of the non-connected vehicle 460 match with the features included in the ID for the non-connected vehicle 410, the connected vehicle 450 may determine that the non-connected vehicle 460 is the same as the non-connected vehicle 410. In some embodiments, the connected vehicle 450 may transmit the obtained features for the non-connected vehicle 410 to the server, and the server may compare the obtained features of the non-connected vehicle 460 with the features included in the ID for the non-connected vehicle 410 to determine whether the non-connected vehicle 460 is the same as the non-connected vehicle 410.

Figure 5:
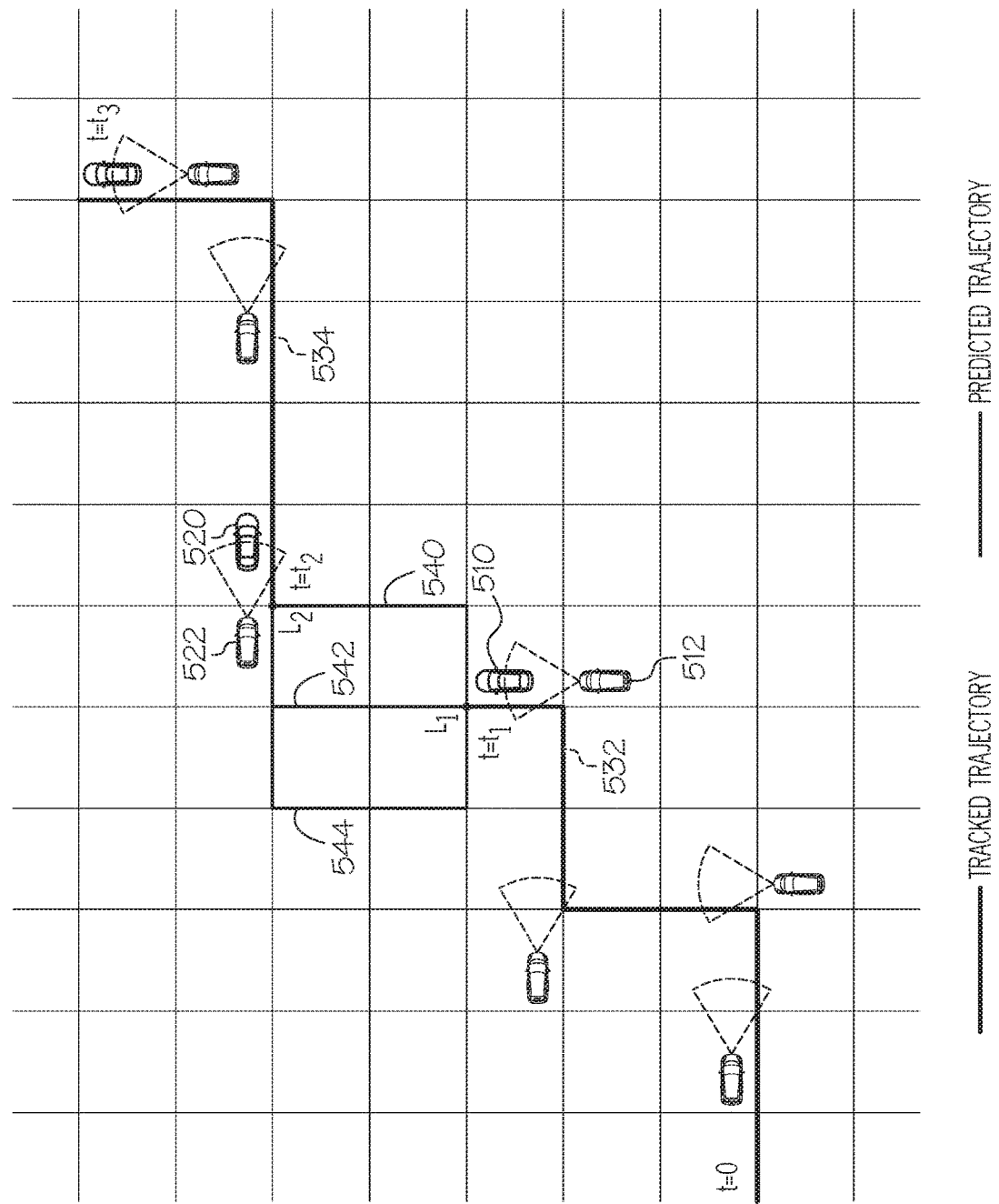
FIG. 5 depicts determining a trajectory of a non-connected vehicle that has not been monitored by connected vehicles, according one or more embodiments shown and described herein.

In step 360, the server may determine a trajectory of the non-connected vehicle between the first location and the second location based on traffic information, a first time when the non-connected vehicle is at the first location, and a second time when the non-connected vehicle is at the second location. By referring to FIG. 5, a non-connected vehicle 510 becomes out of field of view of any connected vehicles at location $L_1$ at time $t_1$. At time $t_2$, a connected vehicle 522 identifies a non-connected vehicle 520 at location $L_2$. The server may determine that the non-connected vehicle 520 is the same as the non-connected vehicle 510 by matching the features included in the ID for the non-connected vehicle 510 with one or more features of the non-connected vehicle 520. Then, the server may determine a trajectory of the non-connected vehicle 510 between location $L_1$ and the location $L_2$.

In embodiment, the server may determine a trajectory of the non-connected vehicle 510 between location $L_1$ and the location $L_2$ based on real-time traffic conditions and the time difference between the first time and the second time. For example, by referring to FIG. 5, the system may predict three potential trajectories 540, 542, 544 for the non-connected vehicle 510 based on real-time traffic conditions. The server may determine that the travel time for trajectories 540, 542, 544 are 10 minutes, 11 minutes, and 13 minutes, respectively, based on real-time traffic information collected from connected vehicles. If the time difference between the first time $t_1$ and the second time $t_2$ is 11 minutes, then the server may determine the trajectory 542 as the trajectory for the non-connected vehicle 510. Similarly, if the time difference between the first time $t_1$ and the second time $t_2$ is 13 minutes, then the server may determine the trajectory 544 as the trajectory for the non-connected vehicle 510.

In some embodiments, the server may simply select the shortest trajectory between the location $L_1$ and the location $L_2$ (e.g., the trajectory 540) as the trajectory for the non-connected vehicle 510. In some embodiments, if a candidate trajectory connecting the location $L_1$ and the location $L_2$ is too long compared to other trajectories such as trajectories 540, 542, 544, the server may exclude the candidate trajectory because it is unlikely that a driver would take the candidate trajectory. In some embodiments, if a trajectory connecting the location $L_1$ and the location $L_2$ is close to any connected vehicles, the system may exclude that trajectory because the partial segment of that trajectory should have been already known and available. For example, if a partial segment of the trajectory 544 is within the field of view of one or more connected vehicles, the system may exclude the trajectory 544 as a trajectory for the non-connected vehicle 510 because the non-connected vehicle 510 should have been identified at the partial segment of the trajectory 544 if the trajectory 544 is the trajectory for the non-connected vehicle 510.

Figure 6:
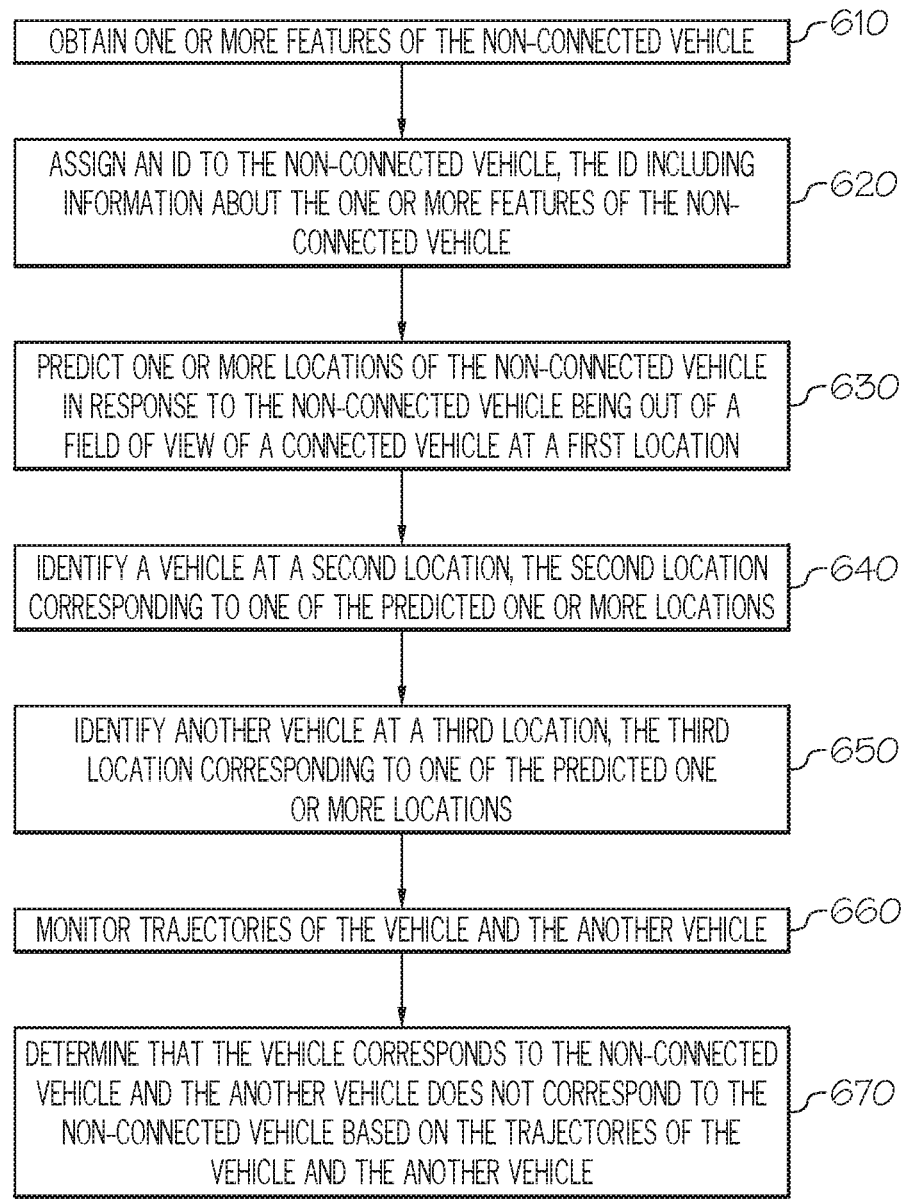
FIG. 6 depicts a flowchart for tracking a non-connected vehicle using connected vehicles, according to another embodiment shown and described herein.

FIG. 6 depicts a flowchart for tracking a non-connected vehicle using connected vehicles, according to another embodiment shown and described herein.

In step 610, a server obtains one or more features of a non-connected vehicle. In embodiments, by referring to FIG. 7, a connected vehicle 712 may capture images of a non-connected vehicle 710 using imaging sensors at time to, and transmit captured images to a server such as the server 110 in FIG. 1. The server may obtain one or more features for the non-connected vehicle 710, such as multi-scale texture features, color features, view point information, accessories, or the like, as described above with reference to step 310.

In embodiments, the connected vehicle 712 may recognize a short-term driving behavior of the non-connected vehicle 710 and transmit the short-term driving behavior to the server. For example, the connected vehicle 712 may analyze the short-term dynamics of the non-connected vehicle 710 to identify the driving pattern of the non-connected vehicle 710 (e.g., speed and acceleration profiles and driving styles at turns). In some embodiments, the connected vehicle 712 may transmit the short-term dynamics of the non-connected vehicle 710 to the server and the server may analyze the short-term dynamics of the non-connected vehicle 710 to identify the driving pattern of the non-connected vehicle 710.

Figure 7:
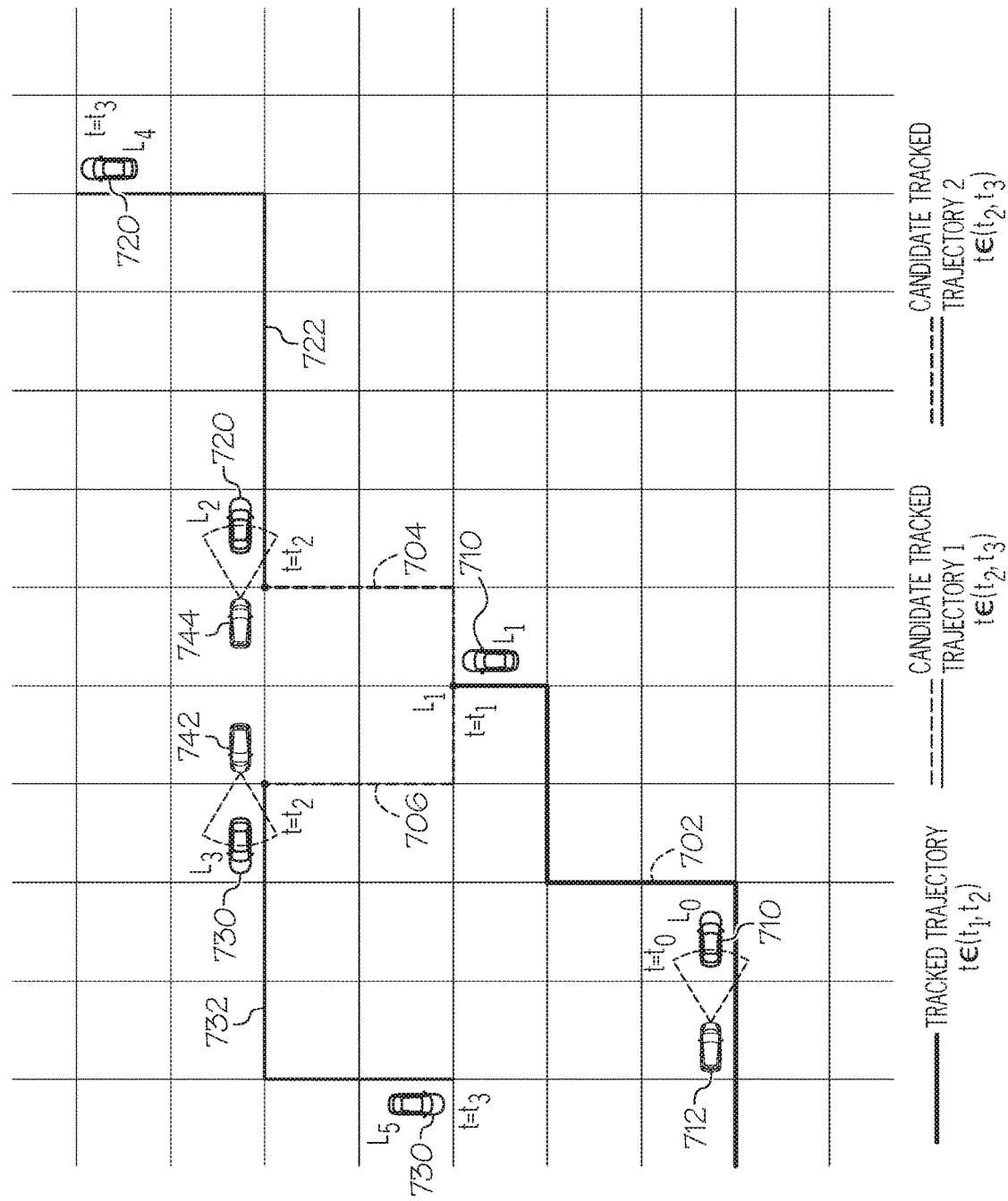
FIG. 7 depicts determining a correct non-connected vehicle among multiple non-connected vehicles based on monitored trajectories of the multiple non-connected vehicles, according one or more embodiments shown and described herein.

Referring to FIG. 6 in conjunction with FIG. 7, in step 620, the server may assign an ID to a non-connected vehicle. In embodiments, the ID includes information about one or more features of the non-connected vehicle. For example, as described above, the ID may include information about multi-scale texture features, color features, view point information, and/or accessories of the non-connected vehicle 710. In addition, the ID may include driving patterns of the non-connected vehicle 710 (e.g., speed and acceleration profiles and driving styles at turns). The combination of the vehicle visual features and the driving pattern may be included in the ID for the non-connected vehicle 710.

Referring to FIG. 6 in conjunction with FIG. 7, in step 630, the server may predict one or more locations of the non-connected vehicle in response to the non-connected vehicle being out of a field of view of a connected vehicle at a first location. By referring to FIG. 7, the non-connected vehicle 710 may be monitored by one or more connected vehicles. One or more connected vehicle may continuously report the location and/or features of the non-connected vehicle 710 to the server. At time $t_1$, the non-connected vehicle 710 becomes out of a field of view of any connected vehicle. That is, imaging devices of any connected vehicle may not be able to capture images of the non-connected vehicle 710 or identify the non-connected vehicle 710 using sensors.

Once the non-connected vehicle 710 is out of a field of view of any connected vehicle, the server may predict one or more locations of the non-connected vehicle 710. For example, by referring to FIG. 7, the server may predict potential trajectories 704 and 706 for the non-connected vehicle 710. The potential trajectories 704, 706 may be determined based on real-time traffic information such as average speed, density, travel time, and the like. The real-time traffic information may be gathered from connected vehicles in the area. The potential trajectories 704, 706 start from the location where the non-connected vehicle 710 becomes out of field of view of any connected vehicle to predicted locations $L_2$ or $L_3$ at future time $t_2$. The predicted locations $L_2$ are $L_3$ are determined based on the real-time traffic information and a time difference, i.e., difference between time $t_1$ and time $t_2$.

Referring to FIG. 6 in conjunction with FIG. 7, in step 640, a connected vehicle may identify a vehicle at a second location that corresponds to one of the predicted one or more locations. Referring to FIG. 7, a connected vehicle 744 may identify a non-connected vehicle 720 at location $L_2$ at time $t_2$. The location $L_2$ is one of the predicted locations determined in step 630. The connected vehicle 744 may transmit information about the identified non-connected vehicle 720 to the server. The connected vehicle 744 may capture images of the non-connected vehicle 720 and obtain features, such as multi-scale texture features, color features, view point information, and the like, of the non-connected vehicle 720. Then, the connected vehicle 744 may compare the obtained features of the non-connected vehicle 720 with the features included in the ID for the previously identified connected vehicle, e.g., the non-connected vehicle 710. In this example, the features of the non-connected vehicle 720 match with the features included in the ID for the non-connected vehicle 710.

Referring to FIG. 6 in conjunction with FIG. 7, in step 650, a connected vehicle may identify another vehicle at a third location that corresponds to one of the predicted one or more locations. Referring to FIG. 7, a connected vehicle 742 may identify a non-connected vehicle 730 at location $L_3$ at time $t_2$. The location $L_3$ is one of the predicted locations determined in step 630. The connected vehicle 742 may transmit information about the identified non-connected vehicle 730 to the server. The connected vehicle 742 may capture images of the non-connected vehicle 730 and obtain features, such as multi-scale texture features, color features, view point information, and the like, of the non-connected vehicle 730. Then, the connected vehicle 742 may compare the obtained features of the non-connected vehicle 730 with the features included in the ID for the previously identified connected vehicle, e.g., the non-connected vehicle 710. In this example, the features of the non-connected vehicle 730 match with the features included in the ID for the non-connected vehicle 710. Thus, in this example, there are two non-connected vehicles that may correspond to the non-connected vehicle 710.

Referring to FIG. 6 in conjunction with FIG. 7, in step 660, one or more connected vehicles may monitor the trajectories of the non-connected vehicle and another non-connected vehicle. By referring to FIG. 7, the trajectory 722 of the non-connected vehicle 720 is monitored by one or more connected vehicles, and the trajectory 722 of the non-connected vehicle 720 may be transmitted to the server. At time $t_3$, the non-connected vehicle 720 is located at location $L_4$. Similarly, the trajectory 732 of the non-connected vehicle 730 is monitored by one or more connected vehicles, and the trajectory 732 of the non-connected vehicle 730 may be transmitted to the server. At time $t_3$, the non-connected vehicle 730 is located at location $L_5$.

In step 670, the server may determine that the vehicle corresponds to the non-connected vehicle and another vehicle does not correspond to the non-connected vehicle based on the trajectories of the vehicle and another vehicle. By referring to FIG. 7, the non-connected vehicle 730 moves toward the trajectory 702 of the non-connected vehicle 710 whereas the non-connected vehicle 720 moves away from the trajectory 702 of the non-connected vehicle 710. In addition, the location $L_5$ of the non-connected vehicle 730 is relatively closer to the original location $L_0$ of the non-connected vehicle 710 compared to the location L$_4$ of the non-connected vehicle 720. Based on the trajectories and locations of the non-connected vehicles 720 and 730, the server may determine that the non-connected vehicle 720 corresponds to the non-connected vehicle 710 and the non-connected vehicle 730 does not correspond to the non-connected vehicle 710 because it is unlikely that the non-connected vehicle 710 would follow the trajectories of the non-connected vehicle 730 shown in FIG. 7. In this regard, the present disclosure enhances the accuracy of identifying a non-connected vehicle at a remote location even if there are multiple non-connected vehicles that may have similar features as an originally identified non-connected vehicle by tracking the trajectories of the multiple non-connected vehicles.

It should be understood that embodiments described herein are directed to systems and methods for tracking a non-connected vehicle even when the non-connected vehicle is out of a field of view of connected vehicles by extracting features of the non-connected vehicle and identifying the non-connected vehicle at a remote location based on the extracted features, and estimating a trajectory for the non-connected vehicle while the non-connected vehicle is not monitored by connected vehicles. The present system utilizes sensors installed in connected vehicles (e.g., cameras, GPS devices, radar sensors, LIDAR sensors, and the like) to monitor a nearby non-connected vehicle in real-time. The vehicle feature information extracted from the images that are captured by the cameras installed in the connected vehicles is stored and shared among connected vehicles. In addition, the driving pattern of the non-connected vehicle may be monitored by connected vehicles and extracted as one additional factor to identify the non-connected vehicle. The vehicle feature information along with driving pattern are later utilized to identify the non-connected vehicle at a different location even after the non-connected vehicle has been out of a field of views of the connected vehicles.

The present disclosure may track non-connected vehicles accurately based on both features and driving patterns of non-connected vehicles that are collected by connected vehicles. In addition, the present disclosure may track non-connected vehicles traveling long-distances by predicting locations of the non-connected vehicles based on real-time traffic conditions. Furthermore, the systems according to the present disclosure may continuously track non-connected vehicles even if they are not continuously observed by connected vehicles. That is, the present system may track non-connected vehicles even at a low market penetration rate of connected vehicles without continuous observations of the non-connected vehicles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for tracking a non-connected vehicle, the method comprising:
   obtaining one or more features of the non-connected vehicle;
   assigning an ID to the non-connected vehicle, the ID including information about the one or more features of the non-connected vehicle;
   predicting one or more locations of the non-connected vehicle at a second time in response to the non-connected vehicle being out of a field of view of a connected vehicle at a first location at a first time, predicting the one or more locations being based on the first location, traffic information, and a difference in time between the first time and the second time;
   identifying a vehicle at a second location at the second time, the second location corresponding to one of the predicted one or more locations; and
   determining whether the identified vehicle at the second location corresponds to the non-connected vehicle based on a comparison of one or more features of the identified vehicle and the ID.

2. The method of claim 1, further comprising:
   tracking the identified vehicle in response to determining that the identified vehicle at the second location corresponds to the non-connected vehicle.

3. The method of claim 1, further comprising:
   determining a trajectory of the non-connected vehicle between the first location and the second location based on traffic information, the first time when the non-connected vehicle is at the first location, and the second time when the non-connected vehicle is at the second location.

4. The method of claim 1, wherein the one or more features include at least one of a multi-scale texture feature, a color feature, a vehicle model, and a vehicle accessory.

5. The method of claim 1, wherein the one or more features include driving behavior characteristics including at least one of a speed, an acceleration profile, a deceleration profile, and a driving style at a turn.

6. The method of claim 1, further comprising:
   feeding the one or more features of the non-connected vehicle into a connected layer of a neural network to generate reduced data representing the one or more features.

7. The method of claim 1, wherein the non-connected vehicle is out of the field of view of a connected vehicle at a first time, and
   wherein predicting one or more locations of the non-connected vehicle in response to the non-connected vehicle being out of the field of view of a connected vehicle comprises:
      predicting a region where the non-connected vehicle is expected to be present at the second time based on the first location, the traffic information, and the difference between the first time and the second time; and
      predicting the one or more locations of the non-connected vehicle based on the region.

8. The method of claim 1, further comprising:
   identifying another vehicle at a third location, the third location corresponding to one of the predicted one or more locations, wherein one or more features of each of the vehicle at the second location and the another vehicle at the third location match with the one or more features of the ID;

monitoring trajectories of the vehicle and the another vehicle; and determining that the vehicle corresponds to the non-connected vehicle and the another vehicle does not correspond to the non-connected vehicle based on the trajectories of the vehicle and the another vehicle.

9. The method of claim 8, further comprising:
determining that the another vehicle moves toward a trajectory of the non-connected vehicle including the first location based on the trajectory of the another vehicle; and determining that the another vehicle does not correspond to the non-connected vehicle in response to determining that the another vehicle moves toward the trajectory of the non-connected vehicle including the first location.

10. The method of claim 1, wherein predicting one or more locations of the non-connected vehicle in response to the non-connected vehicle being out of the field of view of a connected vehicle comprises:
predicting the one or more locations of the non-connected vehicle based on distances between the first location and the one or more locations of the non-connected vehicle.

11. The method of claim 1, wherein obtaining one or more features of the non-connected vehicle comprises:
extracting, by one or more connected vehicles proximate to the non-connected vehicle, one or more features of the non-connected vehicle.

12. The method of claim 1, wherein obtaining one or more features of the non-connected vehicle comprises:
extracting, by one or more unmanned aerial vehicles proximate to the non-connected vehicle, one or more features of the non-connected vehicle.

13. A controller for tracking a non-connected vehicle, the controller programmed to:
obtain one or more features of the non-connected vehicle;
assign an ID to the non-connected vehicle, the ID including information about the one or more features of the non-connected vehicle;
predict one or more locations of the non-connected vehicle at a second time in response to the non-connected vehicle being out of a field of view of a connected vehicle at a first location at a first time, predicting the one or more locations being based on the first location, traffic information, and a difference in time between the first time and the second time;
identify a vehicle at a second location at the second time, the second location corresponding to one of the predicted one or more locations; and
determine whether the identified vehicle at the second location corresponds to the non-connected vehicle based on a comparison of one or more features of the identified vehicle and the ID.

14. The controller of claim 13, wherein the controller is programmed to:
track the identified vehicle in response to determining that the identified vehicle at the second location corresponds to the non-connected vehicle.

15. The controller of claim 13, wherein the controller is programmed to: determine a trajectory of the non-connected vehicle between the first location and the second location based on traffic information, the first time when the non-connected vehicle is at the first location, and the second time when the non-connected vehicle is at the second location.

16. The controller of claim 13, wherein the non-connected vehicle is out of the field of view of a connected vehicle at the first time, and
wherein the controller is programmed to:
predict one or more trajectories of the non-connected vehicle starting from the first location; and
predict the one or more locations of the non-connected vehicle at the second time based on traffic information, the one or more trajectories, and time difference between the first time and the second time.

17. The controller of claim 13, wherein the controller is programmed to:
identify another vehicle at a third location, the third location corresponding to one of the predicted one or more locations, wherein one or more features of each of the vehicle at the second location and the another vehicle at the third location match with the one or more features of the ID;
monitor trajectories of the vehicle and the another vehicle; and
determine that the vehicle corresponds to the non-connected vehicle and the another vehicle does not correspond to the non-connected vehicle based on the trajectories of the vehicle and the another vehicle.

18. A system for tracking a non-connected vehicle, the system comprising:
a first connected vehicle;
a second connected vehicle; and
a server communicatively coupled to the first connected vehicle and the second connected vehicle and configured to:
obtain one or more features of the non-connected vehicle from the first connected vehicle;
assign an ID to the non-connected vehicle, the ID including information about the one or more features of the non-connected vehicle;
predict one or more locations of the non-connected vehicle at a second time in response to the non-connected vehicle being out of a field of view of a connected vehicle at a first location at a first time, predicting the one or more locations being based on the first location, traffic information, and a difference in time between the first time and the second time;
receive one or more features of a vehicle at a second location from the second connected vehicle at the second time, the second location corresponding to one of the predicted one or more locations; and
determine whether the vehicle at the second location corresponds to the non-connected vehicle based on a comparison of the one or more features of the vehicle at the second location and the ID.

19. The system of claim 18, wherein:
the first connected vehicle and the second connected vehicle are autonomous vehicles, and
each of the first connected vehicle and the second connected vehicle includes sensors configured to extract the one or more features of the non-connected vehicle including at least one of a multi-scale texture feature, a color feature, a vehicle model, a vehicle accessory, and behavior characteristics including at least one of a speed, an acceleration profile, a deceleration profile, and a driving style at a turn.

20. The system of claim 18, wherein the server is configured to:
determine a trajectory of the non-connected vehicle between the first location and the second location based on traffic information, the first time when the non-connected vehicle is at the first location, and the second time when the non-connected vehicle is at the second location.

\* \* \* \* \*

UNITED STATES PATENT AND TRADEMARK OFFICE
CERTIFICATE OF CORRECTION

PATENT NO. : 11,386,670 B2  
APPLICATION NO. : 16/592349  
DATED : July 12, 2022  
INVENTOR(S) : Hao Yang et al.

Page 1 of 1

It is certified that error appears in the above-identified patent and that said Letters Patent is hereby corrected as shown below:

On the Title Page

Column 2, item (56), other publications, cite no. 1, delete "https://www.hindawi.com/journals/jat/2017/6905431/" and insert --https://www.hindawi.com/journals/jat/2017/6905431/--, therefor.

In page 2, Column 1, item (56), U.S. patent documents, cite no. 9, delete "Miller" and insert --Miller et al.--, therefor.

In page 2, Column 1, item (56), U.S. patent documents, cite no. 6, delete "Thomas" and insert --Thomas et al.--, therefor.

In page 2, Column 1, item (56), U.S. patent documents, cite no. 20, delete "Jiang" and insert --Jiang et al.--, therefor.

In page 2, Column 1, item (56), U.S. patent documents, cite no. 16, delete "Gignac" and insert --Gignac et al.--, therefor.

Signed and Sealed this  
Thirteenth Day of September, 2022

Katherine Kelly Vidal  
*Director of the United States Patent and Trademark Office*